(12) United States Patent
Suzuki et al.

(10) Patent No.: US 7,838,088 B2
(45) Date of Patent: *Nov. 23, 2010

(54) CYCLIC OLEFIN-BASED POLYMER, AND OPTICAL MATERIAL, POLARIZING PLATE AND LIQUID CRYSTAL DISPLAY DEVICE USING THE SAME

(75) Inventors: Ryo Suzuki, Minami-ashigara (JP); Osamu Uchida, Odawara (JP); Saisuke Watanabe, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 175 days.

This patent is subject to a terminal disclaimer.

(21) Appl. No.: 12/084,709

(22) PCT Filed: Nov. 9, 2006

(86) PCT No.: PCT/JP2006/322794
§ 371 (c)(1),
(2), (4) Date: May 8, 2008

(87) PCT Pub. No.: WO2007/055406
PCT Pub. Date: May 18, 2007

(65) Prior Publication Data
US 2009/0040436 A1    Feb. 12, 2009

(30) Foreign Application Priority Data
Nov. 9, 2005    (JP) .............................. 2005-324702

(51) Int. Cl.
C09K 19/00 (2006.01)
C09K 19/06 (2006.01)
C09K 19/52 (2006.01)
C09K 5/13 (2006.01)
G02F 1/03 (2006.01)

(52) U.S. Cl. ................. 428/1.1; 428/1.3; 428/1.31; 430/20; 430/270.1; 349/167; 349/187; 524/351

(58) Field of Classification Search .............. 430/20, 430/270.1; 349/167, 187; 428/1.1, 1.3, 1.31; 524/351
See application file for complete search history.

(56) References Cited

U.S. PATENT DOCUMENTS
2008/0299329 A1 * 12/2008 Watanabe .................. 428/1.31

FOREIGN PATENT DOCUMENTS

| | | |
|---|---|---|
| JP | 61-292601 A | 12/1986 |
| JP | 2000-38416 A | 2/2000 |
| JP | 3050196 B2 | 6/2000 |
| JP | 2000-241627 A | 9/2000 |
| JP | 2001-98026 A | 4/2001 |
| JP | 2001-356478 A | 12/2001 |
| JP | 2002-20435 A | 1/2002 |
| JP | 2002-504577 A | 2/2002 |
| JP | 2002-255877 A | 9/2002 |
| JP | 2002-543469 A | 12/2002 |
| JP | 2003-255544 A | 9/2003 |
| JP | 2004-231740 A | 8/2004 |
| JP | 2005-148567 A | 6/2005 |
| JP | 2005-164632 A | 6/2005 |
| JP | 2005-290375 A | 10/2005 |
| JP | 2006-16606 A | 1/2006 |
| JP | 2006-518779 A | 8/2006 |
| WO | WO 99/03903 A1 | 1/1999 |
| WO | WO 99/42510 A1 | 8/1999 |
| WO | WO 2004/007587 A1 | 1/2004 |
| WO | WO 2004/049011 A2 | 6/2004 |
| WO | WO 2004/076495 A2 | 9/2004 |

OTHER PUBLICATIONS

International Search Report for PCT/JP2006/322794 dated Dec. 26, 2006.
Joice P. Mathew et al., "($n^3$-Allyl) palladium (II) and Palladium (II) Nitrile Catalysts for the Addition Polymerization of Norbornene Derivatives with Functional Groups", Oct. 13, 1995, pp. 2755-2763.
Brian L. Goodall et al., "Novel Heat-Resistant Cyclic Olefin Polymers Made Using Homogeneous Nickel and Palladium Catalysts", MetCon 97: "Polymers in Transition" Jun. 4-5, 1997.

* cited by examiner

*Primary Examiner*—Geraldina Visconti
(74) *Attorney, Agent, or Firm*—Buchanan Ingersoll & Rooney PC

(57) ABSTRACT

A cyclic olefin-based polymer containing a repeating unit represented by formula (1), an optical material containing the cyclic olefin-based polymer, a polarizing plate containing the optical material, and a liquid crystal display device containing the polarizing plate:

Formula (1)

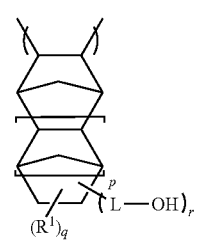

in which $R^1$ represents a substituent; L represents a single bond or a divalent linking group, and forms an alcohol together with the —OH group; p represents an integer of 0 or 1; q represents an integer of from 0 to 3; r represents an integer of from 1 to 4; and $R^1$ and L may be combined with each other to form a 5- to 7-membered ring.

22 Claims, No Drawings

CYCLIC OLEFIN-BASED POLYMER, AND OPTICAL MATERIAL, POLARIZING PLATE AND LIQUID CRYSTAL DISPLAY DEVICE USING THE SAME

TECHNICAL FIELD

The present invention relates to a cyclic olefin-based polymer and an optical material using the polymer.

BACKGROUND ART

A polarizing plate is usually produced by applying, as protective films, films made of cellulose triacetate as a major component on both sides of a polarizer in which iodine or a dichromatic dye to be arranged on and stuck to a polyvinyl alcohol. The cellulose triacetate film has high optical isotropy (low retardation value) and is, therefore, preferably used in applications requiring optical isotropy. On the other hand, it is demanded that optical compensation sheets (phase difference films) for use in, for example, a liquid crystal display device, have optical anisotropy (high retardation value), on the contrary. Therefore, a synthetic polymer film, e.g. a polycarbonate film or polysulfone film, which has a high retardation value, is commonly used as the optical compensation sheet. Also, it is demanded of recent liquid crystal display devices to have a more severe display performance and these devices are therefore expected to be more suppressed in optical performance fluctuation as a result of environmental temperature and humidity.

On the other hand, a cyclic olefin-based film attracts attention as a film which is more reduced in hygroscopicity and moisture permeability and also has a reduced optical performance fluctuation as a result of environmental temperature and humidity, compared with the cellulose triacetate film. In addition, it is being developed as films for polarizing plates or liquid crystal displays. As such a cyclic olefin-based polymer, hydrides of ring-opening polymers and addition polymers as shown below are proposed.

(i) Hydrides of Polymers Obtained by Ring-Opening
   Hydrides of copolymers obtained by ring-opening of tetracyclodecene-based compounds (see Japanese Patent No. 3050196).

(ii) Addition Polymers
   (ii-1) Copolymers of ethylene and a norbornene-based compound (see JP-A-61-292601 ("JP-A" means unexamined published Japanese patent application)).
   (ii-2) Addition polymers of norbornene, and addition copolymers of norbornene and an alkyl-substituted norbornene (see, B. L. Goodall et al., MetCon 97, Jun. 4-5, 1997).
   (ii-3) Addition polymers of a carboxylate of norbornene, and addition copolymers of an alkyl-substituted norbornene and a carboxylate of norbornene (Macromolecules, Vol. 29, 2755 (1996) and PCT International Publication WO2004/49011).
   (ii-4) Addition copolymers of an alkyl-substituted norbornene and a polar group-substituted norbornene (see JP-A-2002-20435).

However, the aforementioned hydrides of ring-opening polymers and addition polymers have the following problems.

The cyclic olefin-based polymers of the above (i) and (ii-1) each have a relatively lower glass transition temperature, and it is therefore difficult to obtain cyclic olefin-based polymers having high glass transition temperatures. Therefore, the cyclic olefin-based polymers are not suitable to uses for which high heat resistance is required. Also, because these polymers have no polar group, they have insufficient bonding and adhesive properties. Particularly, because the polyvinyl alcohol-series polarizer constituting a polarizing plate is hydrophilic, the adhesive property of the polarizing plate to these cyclic olefin-based polymers which are originally hydrophobic is deteriorated significantly as compared with that to triacetylcellulose which is usually used. Moreover, the hydrophilic polyvinyl alcohol-based polarizer itself originally has high hygroscopicity. When the cyclic olefin-based film having a low moisture permeability is used as a protective film constituting the polarizing plate, the water dispersed from the polyvinyl alcohol-based polarizer is prevented from permeation and the inside of the polarizing plate itself is put into a high-temperature and high-moisture state under a high-temperature condition. As a result, fluctuation in light transmittance, the degree of polarization and the like are increased, leading to low reliability. Also, there are problems concerning the production and processing of the polarizing plate that, at the time of producing the polarizing plate using the cyclic olefin-based film having a small moisture permeability as the protective film, the escape of moisture is poor and a long-time drying process is required; and that a long-time humidity conditioning is required when the polarizing plate is used.

The cyclic olefin-based polymers of the above (ii-2) have a high glass transition temperature and are therefore superior in this point. However, the polymers contain no polar group like the polymers of the above (i) and (ii-1) and are therefore inferior in bonding and adhesive properties.

The cyclic olefin-based polymers of the above (ii-3) have a high glass transition temperature and an alkoxycarbonyl group (ester) or an acyloxy group as a polar group, and are therefore superior in bonding and adhesive properties. But they are inferior in anti-hygroscopic properties.

Also, the cellulose triacetate film conventionally used has moisture permeability enough to discharge moisture from a polarizer and, therefore, the permeation of moisture dispersed from a polyvinyl alcohol-based polarizer is not hindered. However, fluctuation in optical performances of the cellulose triacetate film itself as a result of fluctuation in environmental temperature and humidity is found a little.

The cyclic olefin-based polymers of the above (ii-4) have a polar group and are therefore superior in bonding and adhesive properties. However, the polymers have an alkyl group having 3 to 8 carbon atoms and are therefore insufficient for the elastic modulus of a film. Also, there are descriptions as to a hydroxyl group as the polar group in JP-A-2002-20435, however, synthetic examples, action effects on binding and adhesive properties, and production, processing and performance of a polarizing plate are not disclosed or suggested in JP-A-2002-20435.

DISCLOSURE OF INVENTION

According to the present invention, it is possible to provide a cyclic olefin-based polymer excellent in all of the following characteristics: optical performances, heat resistance, bonding properties, adhesive properties and anti-hygroscopic properties. Further, according to the present invention, it is possible to provide an optical material, such as a film, that is excellent in adhesive properties and applicability to a polarizer, has a preferable moisture permeability making it possible to suppress the deterioration of a polarizing plate, and is reduced in optical performances fluctuation as a result of fluctuation in environmental temperature and moisture. Also, according to the present invention, it is possible to provide a polarizing plate and a liquid crystal display device using the above-described optical material and having excellent optical performances.

The present invention provides the following cyclic olefin-based polymer, method of producing the cyclic olefin-based polymer and optical material, particularly optical film, produced using the polymer.

Also, as a result of earnest studies, the inventors of the present invention have found that a polarizing plate using a specified cyclic olefin-based film as a film provided on at least one side of a polarizer has proper moisture permeability and can make a burden reduce in the production of a polarizing plate and in a drying process. Further, it is found that in a polarizing plate using the cyclic olefin-based film of the present invention as a protective film, adhesion of a polarizer to the protective film is excellent and the polarizer is well bonded to the protective film in the processing. The cyclic olefin-based film of the present invention can therefore contribute to an improvement in yield when the polarizing plate is processed and to an improvement in the degree of freedom in the process. It has been also found that the cyclic olefin-based film of the present invention also reduces a deterioration in the characteristics such as light transmittance and degree of polarization of the polarizing plate, with the result that an excellent polarizing plate is obtained. It has been also found that the cyclic olefin-based film of the present invention is remarkably reduced in the fluctuation of the film itself, such as a dimensional fluctuation and a fluctuation in optical performances, as a result of a fluctuation in environmental humidity, and therefore a high quality polarizing plate can be obtained.

According to the present invention, there is provided the following means:

(1) A cyclic olefin-based polymer comprising a repeating unit represented by formula (1):

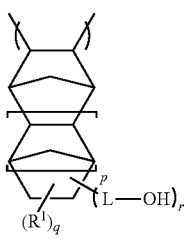

Formula (1)

wherein $R^1$ represents a substituent; L represents a single bond or a divalent linking group, and forms an alcohol together with the —OH group; p represents an integer of 0 or 1; q represents an integer of from 0 to 3; r represents an integer of from 1 to 4; and $R^1$ and L may be combined with each other to form a 5- to 7-membered ring;

(2) The cyclic olefin-based polymer according to the above item (1), wherein said cyclic olefin-based polymer further comprises a repeating unit represented by formula (2):

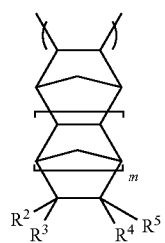

Formula (2)

wherein $R^2$, $R^3$, $R^4$ and $R^5$ each independently represent a hydrogen atom or a substituent excluding an alkyl group having 3 or more carbon atoms; m represents an integer of 0 or 1; and $R^2$, $R^3$, $R^4$ and $R^5$ may be combined with each other to form 5- to 7-membered ring;

(3) A method of producing the cyclic olefin-based polymer according to the above item (1) or (2), which comprises hydrolyzing or solvolyzing a cyclic olefin-based polymer containing a repeating unit represented by formula (3):

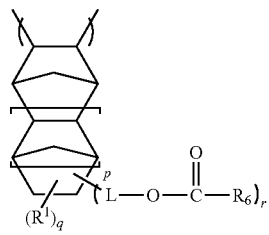

Formula (3)

wherein $R^1$ represents a substituent; L represents a single bond or a divalent linking group; p represents an integer of 0 or 1; q represents an integer of from 0 to 3; r represents an integer of from 1 to 4; $R^1$ and L may be combined with each other to form a 5- to 7-membered ring; and $R^6$ represents a substituent;

(4) The producing method according to the above item (3), wherein the cyclic olefin-based polymer containing a repeating unit represented by formula (3) further comprises a repeating unit represented by formula (2):

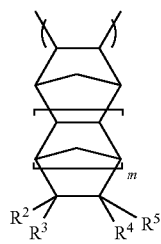

Formula (2)

wherein $R^2$, $R^3$, $R^4$ and $R^5$ each independently represent a hydrogen atom or a substituent excluding an alkyl group having 3 or more carbon atoms; m represents an integer of 0 or 1; and $R^2$, $R^3$, $R^4$ and $R^5$ may be combined with each other to form 5- to 7-membered ring;

(5) An optical material comprising the cyclic olefin-based polymer according to the above item (1) or (2);

(6) The optical material according to the above item (5), wherein the optical material is in a state of thin film form, film form or sheet form;

(7) A polarizing plate comprising a polarizer and two protective films disposed on each side of the polarizer, wherein at least one of the protective films is the optical material according to the above item (6); and (8) A liquid crystal display device comprising at least the polarizing plate according to the above item (7).

Also, the liquid crystal display device preferably has the following embodiments:

(8-1) The liquid crystal display device according to the above item (8), wherein the device is used in a TN mode, wherein the device is produced by laminating discotheque liquid crystal layers, and wherein at least one of the protective films constituting the polarizing plate used in the liquid crystal display device satisfies the following requirements: 0 nm≦(in-plane retardation Re(590))≦20 nm and 40 nm≦(retardation in the film thickness direction Rth(590))≦80 nm;

(8-2) The liquid crystal display device according to the above item (8), wherein the device is used in a VA mode, wherein the device is produced by laminating bar-like liquid crystal layers, and wherein at least one of the protective films constituting the polarizing plate used in the liquid crystal display device satisfies the following requirements: 30 nm≦(in-plane retardation Re(590))≦75 nm and 120 nm≦(retardation in the film thickness direction Rth(590)≦250 nm; and (8-3) The liquid crystal display device according to the above item (8), wherein the device is used in an OCB mode, wherein the device is produced by laminating discotheque liquid crystal layers, and wherein at least one of the protective films constituting the polarizing plate used in the liquid crystal display device satisfies the following requirements: 30 nm≦(in-plane retardation Re(590))≦70 nm and 120 nm≦(retardation in the film thickness direction Rth(590))≦300 nm.

Here, Re(λ) and Rth(λ) represent retardation values Re and Rth measured at a wavelength of λ nm, respectively.

Other and further features and advantages of the invention will appear more fully from the following description.

BEST MODE FOR CARRYING OUT INVENTION

Modes for carrying out the present invention will be hereinafter explained in detail.

The cyclic olefin-based polymer of the present invention is a cyclic olefin-based polymer comprising a repeating unit represented by formula (1).

The polymer of the present invention will be hereinafter explained in more detail. The cyclic olefin-based polymer of the present invention comprising the repeating unit represented by formula (1) may be formed by addition polymerization of a cyclic olefin represented by formula (4).

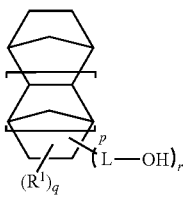

Formula (4)

In formula (4), $R^1$, L, p, q and r have the same meanings as those in formula (1).

In formulas (1) and (4), $R^1$ represents a substituent. Preferred examples of the substituent include a halogen atom (e.g., fluorine, chlorine, bromine, iodine), an alkyl group (preferably an alkyl group having from 1 to 30 carbon atoms, e.g., methyl, ethyl, n-propyl, isopropyl, tert-butyl, n-octyl, 2-ethylhexyl), a cycloalkyl group (preferably a substituted or unsubstituted cycloalkyl group having from 3 to 30 carbon atoms, e.g., cyclohexyl, cyclopentyl, 4-n-dodecyl-cyclohexyl), a bicycloalkyl group (preferably a substituted or unsubstituted bicycloalkyl group having from 5 to 30 carbon atoms, namely, a monovalent group resultant from removing one hydrogen atom of a bicycloalkane having from 5 to 30 carbon atoms, e.g., bicyclo[1,2,2]heptan-2-yl, bicyclo[2,2,2]octan-3-yl), an alkenyl group (preferably a substituted or unsubstituted alkenyl group having from 2 to 30 carbon atoms, e.g., vinyl, allyl), a cycloalkenyl group (preferably a substituted or unsubstituted cycloalkenyl group having from 3 to 30 carbon atoms, namely, a monovalent group resultant from removing one hydrogen atom of a cycloalkene having from 3 to 30 carbon atoms, e.g., 2-cyclopenten-1-yl, 2-cyclohexen-1-yl), a bicycloalkenyl group (a substituted or unsubstituted bicycloalkenyl group, preferably a substituted or unsubstituted bicycloalkenyl group having from 5 to 30 carbon atoms, namely, a monovalent group resultant from removing one hydrogen atom of a bicycloalkene having one double bond, e.g., bicyclo[2,2,1]hept-2-en-1-yl, bicyclo[2,2,2]oct-2-en-4-yl), an alkynyl group (preferably a substituted or unsubstituted alkynyl group having from 2 to 30 carbon atoms, e.g., ethynyl, propargyl), an aryl group (preferably a substituted or unsubstituted aryl group having from 6 to 30 carbon atoms, e.g., phenyl, p-tolyl, naphthyl), a heterocyclic group (preferably a monovalent group resultant from removing one hydrogen atom of a 5- or 6-membered, substituted or unsubstituted, and aromatic or non-aromatic heterocyclic compound, more preferably a 5- or 6-membered aromatic heterocyclic group having from 3 to 30 carbon atoms, e.g., 2-furyl, 2-thienyl, 2-pyrimidinyl, 2-benzothiazolyl), a cyano group, a hydroxyl group, a nitro group, a carboxyl group, an alkoxy group (preferably a substituted or unsubstituted alkoxy group having from 1 to 30 carbon atoms, e.g., methoxy, ethoxy, isopropoxy, tert-butoxy, n-octyloxy, 2-methoxyethoxy), an aryloxy group (preferably a substituted or unsubstituted aryloxy group having from 6 to 30 carbon atoms, e.g., phenoxy, 2-methylphenoxy, 4-tert-butylphenoxy, 3-nitrophenoxy, 2-tetradecanoylaminophenoxy), a silyloxy group (preferably a silyloxy group having from 3 to 20 carbon atoms, e.g., trimethylsilyloxy, tert-butyldimethylsilyloxy), a heterocyclic oxy group (preferably a substituted or unsubstituted heterocyclic oxy group having from 2 to 30 carbon atoms, e.g., 1-phenyltetrazol-5-oxy, 2-tetrahydropyranyloxy), an acyloxy group (preferably a formyloxy group, a substituted or unsubstituted alkylcarbonyloxy group having from 2 to 30 carbon atoms or a substituted or unsubstituted arylcarbonyloxy group having from 6 to 30 carbon atoms, e.g., formyloxy, acetyloxy, pivaloyloxy, stearoyloxy, benzoyloxy, p-methoxyphenylcarbonyloxy), a carbamoyloxy group (preferably a substituted or unsubstituted carbamoyloxy group having from 1 to 30 carbon atoms, e.g., N,N-dimethylcarbamoyloxy, N,N-diethylcarbamoyloxy, morpholinocarbonyloxy, N,N-di-n-octylaminocarbonyloxy, N-n-octylcarbamoyloxy), an alkoxycarbonyloxy group (preferably a substituted or unsubstituted alkoxycarbonyloxy group having from 2 to 30 carbon atoms, e.g., methoxycarbonyloxy, ethoxycarbonyloxy, tert-butoxycarbonyloxy, n-octylcarbonyloxy), an aryloxycarbonyloxy group (preferably a substituted or unsubstituted aryloxycarbonyloxy group having from 7 to 30 carbon atoms, e.g., phenoxycarbonyloxy, p-methoxyphenoxycarbonyloxy, p-n-hexadecyloxyphenoxycarbonyloxy), an amino group (preferably an amino group, a substituted or unsubstituted alkylamino group having from 1 to 30 carbon atoms or a substituted or unsubstituted anilino group having from 6 to 30 carbon atoms, e.g., amino, methylamino, dimethylamino, anilino, N-methyl-anilino, diphenylamino), an acylamino group (preferably a formylamino group, a substituted or unsubstituted alkylcarbonylamino group having from 1 to 30 carbon atoms or a substituted or unsubstituted arylcarbonylamino group having from 6 to 30 carbon atoms, e.g., formylamino, acetylamino, pivaloylamino, lauroylamino, benzoylamino), an aminocarbonylamino group (preferably a substituted or unsubstituted aminocarbonylamino group having from 1 to 30 carbon atoms, e.g., carbamoylamino, N,N-dimethylaminocarbonylamino, N,N-diethylaminocarbonylamino, morpholinocarbonylamino), an alkoxycarbonylamino group (preferably a substituted or unsubstituted alkoxycarbonylamino group having from 2 to 30 carbon atoms, e.g., methoxycarbonylamino, ethoxycarbonylamino, tert-butoxycarbonylamino, n-octadecyloxycarbonylamino, N-methyl-methoxycarbonylamino), an aryloxycarbonylamino group (preferably a substituted or unsubstituted aryloxycarbonylamino group having from 7 to 30 carbon atoms, e.g., phenoxycarbonylamino, p-chlorophenoxycarbonylamino, m-(n-octyloxy)phenoxycarbonylamino), a sulfamoylamino group (preferably a substituted or unsubstituted sulfamoylamino group having from 0 to 30 carbon atoms, e.g., sulfamoylamino, N,N-dimethylaminosulfonylamino, N-n-octylaminosulfonylamino), an alkyl- or aryl-sulfonylamino group (preferably a substituted or unsubstituted alkylsulfonylamino group having from 1 to 30 carbon atoms or a substituted or unsubstituted arylsulfonylamino group having from 6 to 30 carbon atoms, e.g., methylsulfonylamino, butylsulfonylamino, phenylsulfonylamino, 2,3,5-trichlorophenylsulfonylamino, p-methylphenylsulfonylamino), a mercapto group, an alkylthio group (preferably a substituted or unsubstituted alkylthio group having from 1 to 30 carbon atoms, e.g., methylthio, ethylthio, n-hexadecylthio), an arylthio group (preferably a substituted or unsubstituted arylthio group having from 6 to 30 carbon atoms, e.g., phenylthio, p-chlorophenylthio, m-methoxyphenylthio), a heterocyclic thio group (preferably a substituted or unsubstituted heterocyclic thio group having from 2 to 30 carbon atoms, e.g., 2-benzothiazolylthio, 1-phenyltetrazol-5-ylthio), a sulfamoyl group (preferably a substituted or unsubstituted sulfamoyl group having from 0 to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, N—(N'-phenylcarbamoyl)sulfamoyl), a sulfo group, an alkyl- or aryl-sulfinyl group (preferably a substituted or unsubstituted alkylsulfinyl group having from 1 to 30 carbon atoms or a substituted or unsubstituted arylsulfinyl group having from 6 to 30 carbon atoms, e.g., methylsulfinyl, ethylsulfinyl, phenylsulfinyl, p-methylphenylsulfinyl), an alkyl- or aryl-sulfonyl group (preferably a substituted or unsubstituted alkylsulfonyl group having from 1 to 30 carbon atoms or a substituted or unsubstituted arylsulfonyl group having from 6 to 30 carbon atoms, e.g., methylsulfonyl, ethylsulfonyl, phenylsulfonyl, p-methylphenylsulfonyl), an acyl group (preferably a formyl group, a substituted or unsubstituted alkylcarbonyl group having from 2 to 30 carbon atoms, or a substituted or unsubstituted arylcarbonyl group having from 7 to 30 carbon atoms, e.g., acetyl, pivaloyl, benzoyl), an aryloxycarbonyl group (preferably a substituted or unsubstituted aryloxycarbonyl group having from 7 to 30 carbon atoms, e.g., phenoxycarbonyl, o-chlorophenoxycarbonyl, m-nitrophenoxycarbonyl, p-tert-butylphenoxycarbonyl), an alkoxycarbonyl group (preferably a substituted or unsubstituted alkoxycarbonyl group having from 2 to 30 carbon atoms, e.g., methoxycarbonyl, ethoxycarbonyl, tert-butoxycarbonyl, n-octadecyloxycarbonyl), a carbamoyl group (preferably a substituted or unsubstituted carbamoyl group having from 1 to 30 carbon atoms, e.g., carbamoyl, N-methylcarbamoyl, N,N-dimethylcarbamoyl, N,N-di-n-octylcarbamoyl, N-(methylsulfonyl)-carbamoyl), an aryl- or heterocyclic-azo group (preferably a substituted or unsubstituted arylazo group having from 6 to 30 carbon atoms or a substituted or unsubstituted heterocyclic-azo group having from 3 to 30 carbon atoms, e.g., phenylazo, p-chlorophenylazo, 5-ethylthio-1,3,4-thiadiazol-2-ylazo), an imido group (preferably N-succinimido, N-phthalimido), a phosphino group (preferably a substituted or unsubstituted phosphino group having from 2 to 30 carbon atoms, e.g., dimethylphosphino, diphenylphosphino, methylphenoxyphosphino), a phosphinyl group (preferably a substituted or unsubstituted phosphinyl group having from 2 to 30 carbon atoms, e.g., phosphinyl, dioctyloxyphosphinyl, diethoxyphosphinyl), a phosphinyloxy group (preferably a substituted or unsubstituted phosphinyloxy group having from 2 to 30 carbon atoms, e.g., diphenoxyphosphinyloxy, dioctyloxyphosphinyloxy), a phosphinylamino group (preferably a substituted or unsubstituted phosphinylamino group having from 2 to 30 carbon atoms, e.g., dimethoxyphosphinylamino, dimethylaminophosphinylamino), and a silyl group (preferably a substituted or unsubstituted silyl group having from 3 to 30 carbon atoms, e.g., trimethylsilyl, tert-butyldimethylsilyl, phenyldimethylsilyl).

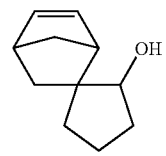

(4-9)

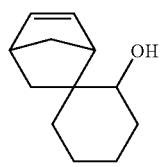

(4-10)

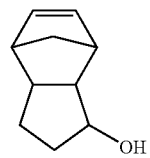

(4-11)

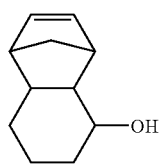

(4-12)

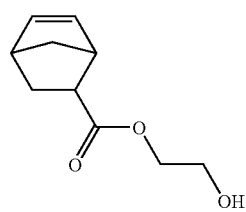

(4-13)

-continued

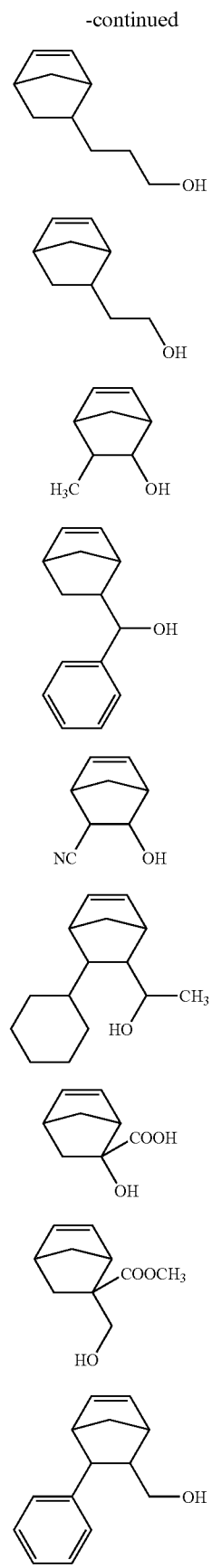

(4-14)
(4-15)
(4-16)
(4-17)
(4-18)
(4-19)
(4-20)
(4-21)
(4-22)

-continued

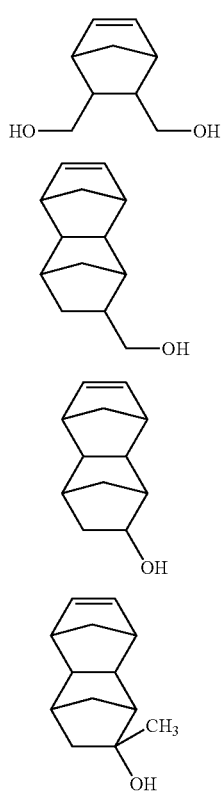

(4-23)
(4-24)
(4-25)
(4-26)

The cyclic olefin represented by formula (4) may be used either singly or in combinations of two or more in the present invention.

The cyclic olefin-based polymer of the present invention further comprising the repeating unit represented by formula (2) may be synthesized using a specified cyclic olefin represented by formula (5).

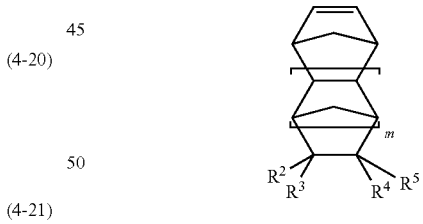

Formula (5)

Among the substituents, with respect to one having a hydrogen atom, the hydrogen atom may be removed and be substituted by any of the above-mentioned substituents. Examples thereof include an alkylcarbonylaminosulfonyl group, an arylcarbonylaminosulfonyl group, an alkylsulfonylaminocarbonyl group, and an arylsulfonylaminocarbonyl group. Specific examples thereof include methylsulfonylaminocarbonyl, p-methylphenylsulfonylaminocarbonyl, acetylaminosulfonyl, and benzoylaminosulfonyl.

Also, when two or more substituents are present, they may be the same or different. Also, they may be combined with each other to form a ring if possible.

In formulas (1) and (4), $R^1$ is more preferably a halogen atom, an alkyl group having 1 to 10 carbon atoms, an aryl group having 6 to 10 carbon atoms, a cycloalkyl group having 3 to 10 carbon atoms, a cyano group, an acyloxy group having 2 to 10 carbon atoms or an alkoxycarbonyl group having 2 to 10 carbon atoms.

In formulas (1) and (4), L represents a single bond or a divalent linking group. In addition, L forms an alcohol together with the —OH group in formula (1). The divalent linking group is preferably an alkylene group, an alkenylene group, an alkynylene group or an arylene group, each of which may have a substituent, or a group obtained by combining two or more of these groups. When the group is constituted by combining two or more these groups, they may be connected by other divalent linking group. Examples of such divalent linking group include —$NR^7$— ($R^7$ represents a hydrogen atom, or an alkyl group or an aryl group, each of which may have a substituent), —O—, —S—, —SO—, —$SO_2$—, —CO—, —$SO_2NR^7$—, —$NR^7SO_2$—, —$CONR^7$—, —$NR^7CO$—, —COO— and —OCO—. Here, as the substituent, the examples of the substituent given as $R^1$ can be mentioned.

In formulas (1) and (4), L is more preferably a single bond, or an alkylene group having 1 to 10 carbon atoms, preferably 1 to 6 carbon atoms, which may be substituted.

In formulas (1) and (4), p is an integer of 1 or 0, and more preferably 0.

In formulas (1) and (4), q is an integer of from 0 to 3, and more preferably an integer of 0 or 1.

In formulas (1) and (4), r is an integer of from 1 to 4, and more preferably an integer of 1 or 2.

$R^1$ and L may be combined with each other to form a 5- to 7-membered ring, preferably 5- or 6-membered ring. Also, this ring may be a carbon ring or a heterocyclic ring, and preferably a carbon ring.

Specific examples of the cyclic olefin represented by formula (4) are shown below, but the invention is not meant to be limited to these.

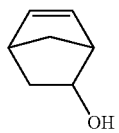
(4-1)

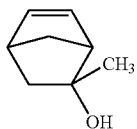
(4-2)

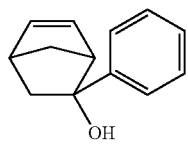
(4-3)

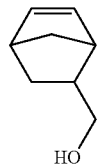
(4-4)

-continued

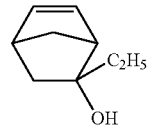
(4-5)

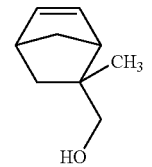
(4-6)

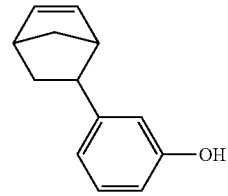
(4-7)

(4-8)

In formula (5), $R^2$, $R^3$, $R^4$, $R^5$ and m have the same meanings as those in formula (2).

$R^2$, $R^3$, $R^4$ and $R^5$ each independently represent a hydrogen atom or a substituent excluding an alkyl group having 3 or more carbon atoms. Preferable examples of the substituent are the same as those given as the examples of the substituent $R^1$ described in the explanations of formulas (1) and (4). Preferred examples of $R^2$, $R^3$, $R^4$ and $R^5$ include a hydrogen atom, a halogen atom, an alkyl group having 1 to 2 carbon atoms, an aryl group having 6 to 10 carbon atoms, an alkoxy group having 1 to 10 carbon atoms, a cyano group, an acyloxy group having 2 to 10 carbon atoms, an alkoxycarbonyl group having 2 to 10 carbon atoms, an acyl group having 1 to 10 carbon atoms and a carboxyl group. Also, if possible, $R^2$, $R^3$, $R^4$ and $R^5$ may be combined with each other to form a 5- to 7-membered ring, preferably a 5- or 6-membered ring. The ring may be a carbon ring or a hetero ring.

In formulas (2) and (5), m is an integer of 1 or 0, and more preferably 0.

Specific examples of the cyclic olefin represented by formula (5) are shown below, but the invention is not meant to be limited to these.

(5-1)

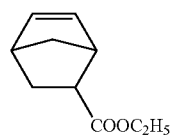
(5-2)

-continued
 (5-3)
 (5-4)
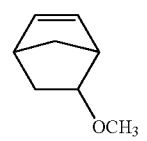 (5-5)
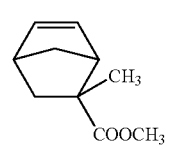 (5-6)
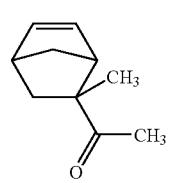 (5-7)
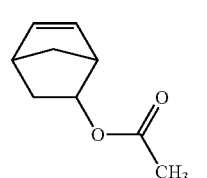 (5-8)
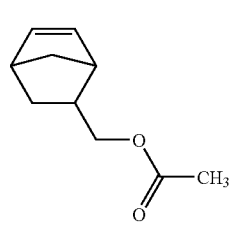 (5-9)
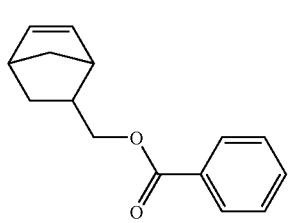 (5-10)
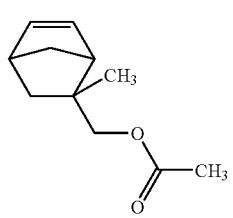 (5-11)
-continued
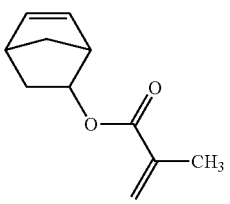 (5-12)
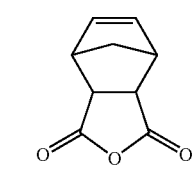 (5-13)
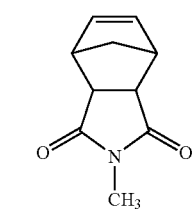 (5-14)
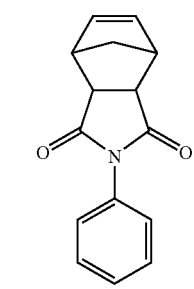 (5-15)
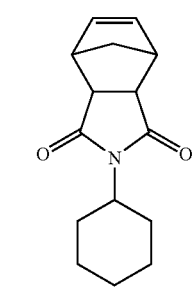 (5-16)
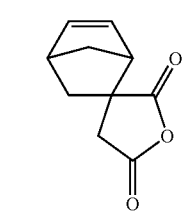 (5-17)
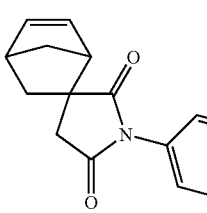 (5-18)

-continued (5-19) 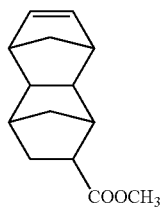

(5-20) 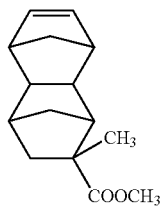

(5-21) 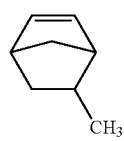

(5-22) 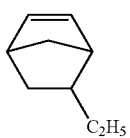

(5-23) 

(5-24) 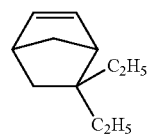

(5-25) 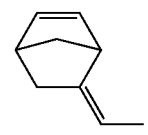

(5-26) 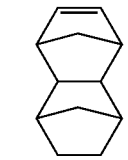

(5-27) 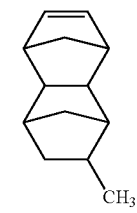

-continued (5-28) 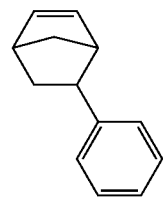

(5-29) 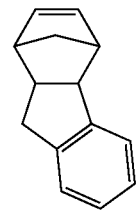

(5-30) 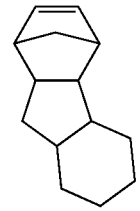

(5-31) 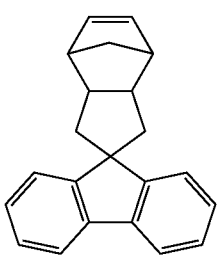

(5-32) 

The cyclic olefin represented by formula (5) may be used either singly or in combinations of two or more in the present invention.

The cyclic olefin that can be used in the present invention may be synthesized with reference to methods already known in various references. Examples of these methods include the method described in Bull. Chem. Soc. Jpn., 48, pp. 3641-3644 (1975) and the method described in J. Chem. Soc. Perkin Trans., 2, pp. 17-22 (1974). However, the method of producing the cyclic olefin that can be used in the present invention is not limited to these methods.

The content of the repeating unit represented by formula (1) in the cyclic olefin-based polymer of the present invention is preferably from 0.01 mol % to 30 mol %, more preferably from 0.1 mol % to 25 mol %, and particularly preferably from 1 mol % to 20 mol % based on all repeating units. When the cyclic olefin-based polymer of the present invention has the repeating unit represented by formula (2), the content of the repeating unit in the polymer is preferably from 70 mol % to 99.99 mol %, more preferably from 75 mol % to 99.9 mol %, and particularly preferably from 80 mol % to 99 mol % based on all repeating units. The preferable contents are not limited to these ranges, because they vary depending on the structures of the repeating units.

The cyclic olefin-based polymer of the present invention has the number average molecular weight of preferably 10,000 to 1,000,000, and more preferably 50,000 to 500,000 based on polystyrene when measured by gel permeation chromatography using tetrahydrofuran as a solvent. The weight average molecular weight of the cyclic polyolefin-based polymer is preferably 15,000 to 1,500,000, and more preferably 70,000 to 700,000 based on polystyrene. When the polystyrene-based number average molecular weight or weight average molecular weight of the cyclic polyolefin-based polymer is too small, the anti-break strength may be insufficient. On the other hand, when the polystyrene-based number average molecular weight or weight average molecular weight of the cyclic polyolefin-based polymer is too large, the molding processability of the cyclic olefin-based polymer into a sheet is deteriorated. In addition, when the cyclic olefin-based polymer is used to form a cast film or the like, the viscosity of the solution is increased, bringing about handling difficulty in some cases.

The glass transition temperature of the cyclic olefin-based polymer of the present invention is preferably 100 to 400° C., more preferably 150 to 380° C., and farther preferably 200 to 350° C. when measured by a differential scanning calorimeter (DSC). When the glass transition temperature is too low, thermal deformation is easily caused when the polymer is used as optical materials. On the other hand, when the glass transition temperature is too high, the polymer may be heat-decomposed when it is molded by heat, in some cases.

The tensile elastic modulus of the cyclic olefin-based polymer of the present invention is preferably 1,200 MPa or more, and more preferably 1,500 MPa or more. When the tensile elastic modulus is low, the self-sustaining ability of the film is insufficient and therefore it is difficult to handle the polymer as an optical material, such as a polarizing plate, in some cases.

The cyclic olefin-based polymer of the present invention may be converted into a crosslinked polymer by adding a crosslinking agent, such as a silane coupling agent containing a peroxide, sulfur, disulfide, polysulfide compound, dioxime compound, tetrasulfide or the like, in an amount of 0.05 to 5 parts by mass based on 100 parts by mass of the (co)polymer of the present invention and then by, for example, heating the mixture, or may be converted into a crosslinked polymer by directly applying light or electron beams to the polymer.

The cyclic olefin-based polymer of the present invention has excellent optical transparency, heat resistance, bonding property, adhesive property and anti-hygroscopicity. It is therefore preferably used for optical materials, such as an optical disk, optical fiber, and lens and prism, electronic parts, medical instruments, and container, as well as a liquid crystal element substrate, light guide plate, polarizing film, phase difference film, liquid crystal back light, liquid crystal panel, OHP film and transparent conductive film.

The cyclic olefin-based polymer of the present invention, that is, a polymer synthesized using the specific cyclic olefin may be obtained by the following production methods. Using [Pd(CH$_3$CN)$_4$][BF$_4$]$_2$, di-1-chloro-bis-(6-methoxybicyclo[2,2,1]hepto-2-ene-endo-5Y,2π)-Pd (hereinafter abbreviated as "I") and methylalumoxane (MAO); I and AgBF$_4$; I and AgSbF$_6$; [(η$^3$-allyl)PdCl]$_2$ and AgSbF$_6$; [(η$^3$-allyl)PdCl]$_2$ and AgBF$_4$; [(η$^3$-crotyl)Pd(cyclooctadiene)][PF$_6$], [(η$^3$-crotyl)Ni(cyclooctadiene)][B((CF$_3$)$_2$C$_6$H$_4$)$_4$], [NiBr(NPMe$_3$)]$_4$ and MAO; Ni(octoate)$_2$ and MAO; Ni(octoate)$_2$, B(C$_6$F$_5$)$_3$ and AlEt$_3$; Ni(octoate)$_2$, [ph$_3$C][B(C$_6$F$_5$)$_4$] and Ali-Bu$_3$; or Co(neodecanoate) and a cationic complex or a catalyst which forms a cationic complex of a metal of the VIII group, such as Ni, Pd or Co, in periodic chart (for example, MAO), the specific cyclic olefin compound may be (co)polymerized at a temperature range of −20 to 100° C. in a solvent selected from an alicyclic hydrocarbon solvent, such as cyclohexane, cyclopentane and methylcyclopentane; an aliphatic hydrocarbon solvent, such as pentane, hexane, heptane and octane; an aromatic hydrocarbon solvent, such as toluene, benzene and xylene; a hydrocarbon halide solvent, such as dichloromethane, 1,2-dichloroethylene and chlorobenzene; and a polar solvent, such as ethyl acetate, butyl acetate, γ-butyrolactone, propylene glycol dimethyl ether and nitromethane, to give the cyclic olefin-based polymer of the present invention.

Also, the methods described in, for example, Macromolecules, 1996, vol. 29, p. 2755, Macromolecules, 2002, vol. 35, p. 8969, and International Patent Application Laid-Open WO2004/7564 may be preferably used.

Also, the cyclic olefin-based polymer of the present invention may also be synthesized by synthesizing a cyclic olefin-based polymer containing a repeating unit represented by formula (3) by the above method, and then by conducting hydrolysis or solvolysis of the polymer.

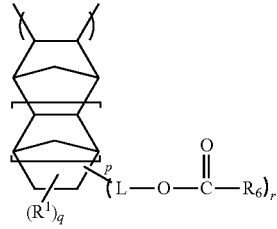

Formula (3)

In formula (3), R$^1$, L, p, q and r have the same meanings as those in formula (1). R$_6$ represents a substituent.

R$^6$ represents a substituent. As preferable examples of the substituent, those given as the examples of the substituent R$^1$ described in the explanations of formulas (1) and (4) may be applied. Preferable examples of the substituent include alkyl groups having 1 to 10 carbon atoms, aryl groups having 6 to 10 carbon atoms, alkoxy groups having 1 to 10 carbon atoms, aryloxy groups having 6 to 10 carbon atoms and amino groups having 0 to 10 carbon atoms, each of which may have a substituent.

For the hydrolysis or solvolysis of the cyclic olefin-based polymer containing a repeating unit represented by formula (3), known methods, for example, acid catalyst hydrolysis, basic catalyst hydrolysis, alcoholysis and aminolysis as described in, for example, T. W. GREENE, R. G. M. WUTS, "PROTECTIVE GROUPS IN ORGANIC SYNTHESIS SECOND EDITION" (JOHN WILEY & SONS, Inc., 1991), pp. 87-113 may be applied.

The optical material of the present invention is preferably a thin film (membrane), a film or a sheet form. In this case, the thickness of the optical material is preferably 10 to 300 μm. If the thickness is too thin, it is difficult to adjust the thickness evenness of the optical material. To the contrary, if the thickness is too thick, the transparency of the optical material decreases. Also, these optical materials are preferably formed using a composition containing the cyclic olefin-based polymer of the present invention.

Explanations will be given as to a composition containing the cyclic olefin-based polymer of the present invention and an optical material formed from the composition.

(Additive)

To the cyclic polyolefin-based polymer composition that can be used in the present invention can be added various additives (for example, deterioration preventive, ultraviolet preventive, retardation (optical anisotropy) regulator, fine particles, peeling accelerator and infrared absorber). These additives may be solid or oily materials. As to the time at which these additives are added, each additive may be added in any time during the process of preparing a solution (dope) of the cyclic polyolefin-based polymer in the case of forming a film by a solution casting method. Alternatively, a step of formulating these additives is added to the final dope preparing step. In the case of producing a film by a melting method, each additive may be added when a resin pellet is produced or may be kneaded at the time of producing a film. No particular limitation is imposed on the amount of each raw material. Also, when the cyclic polyolefin-based film is formed of a multilayer, the kind and amount of each additive in each layer may be different.

(Deterioration Preventive)

A known deterioration preventive (anti-oxidizing agent) may be added to the cyclic polyolefin-based polymer composition that can be used in the present invention. Examples thereof include phenol-based or hydroquinone-based anti-oxidizing agents, such as 2,6-di-t-butyl-4-methylphenol, 4,4'-thiobis-(6-t-butyl-3-methylphenol) and pentaerythrityl-tetrakis[3-(3,5-di-t-butyl-4-hydroxyphenyl)propionate. Also, phosphorous-based oxidation preventives, such as tris (4-methoxy-3,5-diphenyl)phosphite, tris(nonylphenyl)phosphite and bis(2,4-di-t-butylphenyl)pentaerythritol diphosphite can be preferably added. The anti-oxidizing agent is preferably added in an amount of 0.05 to 5.0 parts by mass based on 100 parts by mass of the cyclic polyolefin-based polymer.

(Ultraviolet Absorber)

An ultraviolet absorber is preferably used in the cyclic polyolefin-based polymer composition that can be used in the present invention from the viewpoint of preventing the polarizing plate or the liquid crystal from deteriorating. As the ultraviolet absorber, those which are superior in the ability of absorbing ultraviolet rays having a wavelength of 370 nm or less and are reduced in the absorbance of the visible light having a wavelength of 400 nm or more from the viewpoint of obtaining high liquid crystal display ability, can be preferably used. Specific examples of the ultraviolet absorber that can be preferably used in the present invention include hindered phenol-based compounds, oxybenzophenone-based compounds, benzotriazole-based compounds, salicylate-based compounds, benzophenone-based compounds, cyanoacrylate-based compounds and nickel complex-based compounds. The amount by mass of the ultraviolet absorber is preferably 1 ppm to 1.0% and more preferably 10 to 1,000 ppm based on the cyclic polyolefin-based polymer.

(Fine Particles)

Next, the fine particles that can be used in the present invention will be described. In order to improve poor slipping properties of the surface of the film, it is effective to impart irregularities (unevenness) to the surface of the film. A method is known in which fine particles of an organic or inorganic material are compounded to increase the roughness of the film surface, that is, to form the so-called matted surface to thereby decrease the blocking among films. Moreover, in the present invention, the presence of the fine particles in the cyclic olefin-based film or on at least one surface of the cyclic olefin-based film remarkably improves the adhesion between the polarizer and the cyclic olefin-based film in the processing of the polarizing plate.

The matt agent that can be used in the present invention is preferably fine particles having an average particle diameter of 0.05 µm to 0.5 µm, more preferably 0.08 µm to 0.3 µm, and still more preferably 0.1 µm to 0.25 µm, in the case of the inorganic fine particles.

As the fine particles that can be used in the present invention, silicon dioxide, silicone and titanium dioxide are preferable as the inorganic compound, and fluororesins, nylon, polypropylene and chlorinated polyether are preferable as the high-molecular compound. Silicon dioxide is more preferable, and silicon dioxide, which is surface-treated with an organic material, is particularly preferable.

(Peeling Accelerator)

As additives reducing the peeling resistance of the cyclic polyolefin-based film, many materials, which have a significantly high effect, are found among surfactants. As preferable peeling agents, phosphate-based surfactants, carboxylic acid or carboxylate-based surfactants, sulfonic acid or sulfonate-based surfactants and sulfate-based surfactant are effective. Also, fluorine-based surfactants are effective which are obtained by substituting fluorine atoms for a part of hydrogen atoms bound with the hydrocarbon chain of the above surfactants. The amount of the peeling agent is preferably 0.05 to 5 mass %, more preferably 0.1 to 2 mass %, and most preferably 0.1 to 0.5 mass % based on the cyclic polyolefin polymer.

(Retardation Developer)

In the present invention, a compound having at least two aromatic rings may be used as the retardation developer to develop a retardation value. When the retardation developer is used, it is used in an amount range of from, preferably 0.05 to 20 parts by mass, more preferably 0.1 to 10 parts by mass, still more preferably 0.2 to 5 parts by mass and most preferably 0.5 to 2 parts by mass, based on 100 parts by mass of the polymer. Two or more retardation developers may be used in combination.

The retardation developer preferably has a maximum absorption in a wavelength range of 250 to 400 m and has substantially no absorption in the visible region. Here, the term "aromatic ring" includes aromatic hetero rings besides aromatic hydrocarbon rings.

The number of aromatic rings contained in the retardation developer is preferably 2 to 20, more preferably 2 to 12, still more preferably 2 to 8 and most preferably 2 to 6.

Examples of the retardation developer include, though not limited to, developers as described in EP 0911656 A2 and JP-A-2003-344655.

The amount of the retardation developer is preferably 0.1 to 30% by mass, and more preferably 0.5 to 20% by mass, based on the amount of the cyclic polyolefin.

(Production of the Cyclic Olefin-Based Film)

For the production of the cyclic olefin-based film of the present invention, there are a heat melt film production method and a solution film production method. Any of these methods may be applied. In the present invention, it is preferable to use the solution film production method enabling the production of a film having a good surface condition. First, the solution film production method is explained.

(Organic Solvent)

Next, an organic solvent in which the cyclic polyolefin-based polymer of the present invention is to be dissolved will be explained. In the present invention, any organic solvent may be used without any particular limitation insofar as its purpose can be attained to the extent that the cyclic polyolefin-based polymer is dissolved and cast and a film is formed.

The organic solvent that can be used in the present invention is preferably a solvent selected from chlorine-based solvents typified by dichloromethane and chloroform, and straight-chain hydrocarbons, cyclic hydrocarbons, aromatic hydrocarbons, esters, ketones and ethers, each of which have 3 to 12 carbon atoms. These esters, ketones and ethers may have a cyclic structure. Examples of the straight-chain hydrocarbons having 3 to 12 carbon atoms include hexane, octane, isooctane and decane. Examples of the cyclic hydrocarbons having 3 to 12 carbon atoms include cyclopentane, cyclohexane, decalin, and their derivatives. Examples of the aromatic hydrocarbons having 3 to 12 carbon atoms include benzene, toluene and xylene. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methylcyclohexanone. Examples of the ethers having 3 to 12 carbon atoms include diisopropyl ether, dimethoxymethane, dimethoxyethane, 1,4-dioxane, 1,3-dioxorane, tetrahydrofuran, anisole and phenetole. Examples of the organic solvent having two or more functional groups include 2-ethoxyethyl acetate, 2-methoxyethanol and 2-butoxyethanol. The boiling point of the organic solvent is preferably 35° C. or higher and 200° C. or lower. As the solvent that can be used in the present invention, a mixture of two or more solvents may be used to adjust the solution properties, such as drying ability and viscosity. It is also possible to add a poor solvent insofar as the cyclic polyolefin-based polymer can be dissolved in a mixture solvent containing the poor solvent.

A preferable poor solvent may be appropriately selected according to the kind of the polymer to be used. When the chlorine-based organic solvent is used as a good solvent, alcohols may be preferably used. The alcohols may be straight-chain, branched-chain or cyclic alcohols. Among these, saturated aliphatic hydrocarbons are preferable. The alcohols may have any of primary to tertiary hydroxyl groups. As the alcohol, a fluorine-based alcohol may be also used. Examples of the fluorine-based alcohol include 2-fluoroethanol, 2,2,2-trifluoroethanol and 2,2,3,3-tetrafluoro-1-propanol. Among the poor solvents, primary alcohols are particularly preferably used because they have the effect of reducing peeling resistance. Although particularly preferable alcohols vary depending on the kind of the good solvent to be selected, alcohols having a boiling point of 120° C. or lower are preferably used, monovalent alcohols having 1 to 6 carbon atoms are more preferably used, and alcohols having 1 to 4 carbon atoms are particularly preferably used in consideration of a drying load. A particularly preferable mixture solvent used to prepare the cyclic polyolefin solution is a combination of dichloromethane as a major solvent and one or more alcohols selected from methanol, ethanol, propanol, isopropanol and butanol as a poor solvent.

(Preparation of Dope)

Examples of a method of preparing the cyclic polyolefin solution (dope) that can be used in the present invention include a method in which the polymer is dissolved at ambient temperature under stirring; a cooling dissolution method in which the polymer is stirred at ambient temperature to swell it, cooled to a temperature of from −20 to −100° C., and then heated again to a temperature of from 20 to 100° C. to dissolve it; a high-temperature dissolution method in which the temperature of the system is raised to a temperature higher than the boiling point of a major solvent in a closed container to dissolve the polymer; and a method in which the temperature and pressure of the system are raised to the critical point of the used solvent to dissolve the polymer. The viscosity of the cyclic polyolefin solution that can be used in the present invention is preferably in a range of 1 to 500 Pa·s and more preferably in a range of 5 to 200 Pa·s at 25° C. The viscosity is measured in the following manner. 1 mL of a sample solution is subjected to a rheometer (trade name: CLS 500, manufactured by TA Instruments) using a Steel Cone (trade name, manufactured by TA Instruments) having a diameter of 4 cm/2° to measure its viscosity. The sample solution is kept under control at a starting temperature of the measurement until the solution temperature is fixed, and then the measurement is started.

The solution is preferably subjected to filtration using a proper filter material such as a metal network or a flannel, to remove unsolved substances, contaminants and foreign substances such as impurities in advance prior to the casting.

It is only required that the cyclic polyolefin solution just before the solution is applied has a viscosity range which makes it possible to cast the solution when it is applied. The viscosity is usually adjusted to a range of preferably 5 Pa·s to 1000 Pa·s, more preferably 15 Pa·s to 500 Pa·s, and still more preferably 30 Pa·s to 200 Pa·s. There is no particular limitation to the temperature at this time insofar as the temperature is in the range of the casting temperature. However, the temperature is preferably −5 to 70° C. and more preferably −5 to 35° C.

(Film Production)

A method of producing a film by using the cyclic polyolefin solution will be explained. As the method and equipment for producing the cyclic polyolefin-based film of the present invention, the same solution casting film-producing method and solution casting film producing apparatus that are used in the production of the conventional cellulose triacetate film may be used. The dope (cyclic polyolefin solution) prepared in a dissolution machine (kettle) is stored once in a storage kiln to defoam the dope in the final preparation.

To the present invention, there can be further applied film production technologies described in JP-A-2000-301555, JP-A-2000-301558, JP-A-7-032391, JP-A-3-193316, JP-A-5-086212, JP-A-62-037113, JP-A-2-276607, JP-A-55-014201, JP-A-2-111511, and JP-A-2-208650.

(Multilayer Casting)

The cyclic polyolefin solution may be cast as a single layer solution, or plural cyclic polyolefin solutions for two or more layers (multilayer) may be cast, on a smooth band or drum as a metal support. In the case of the multilayer casting, no particular limitation is imposed on each thickness of the inside layer and outside layer. However, the thickness of the outside layer is preferably 1 to 50% and more preferably 2% to 30% of all the thickness of the layers.

(Casting)

Examples of the method of casting the solution include a method wherein a prepared dope is uniformly extruded from a pressure die to a metallic support, a method with the use of a doctor blade wherein a dope once cast on a metallic support is treated with a blade to control the film thickness, and a method with the use of a reverse roll coater wherein the film is controlled with a roll rotating in the reverse direction. The pressure die method is favorable. The temperature of the cyclic polyolefin solution to be cast preferably ranges from −10 to 55° C., and still preferably from 25 to 50° C. The temperature may be maintained at the same level throughout the process or vary from step to step. In the case of varying, the temperature should attain the desired level immediately before the casting.

(Drying)

On the metallic support relating to the production of the cyclic polyolefin-based film, the dope is dried generally by the method of blowing a hot air stream from the front face side of the metallic support (a drum or a band), i.e., the web surface on the metallic support, the method of blowing a hot air stream form the back face of the drum or the band, or the liquid heat transfer method comprising bringing a temperature-controlled liquid into contact with the band or the drum from the back face (i.e., the opposite face of the dope casting face), thus heating the drum or the band by heat-transfer and controlling the surface temperature. The back face liquid heat transfer method is favorable. Before the casting, the surface temperature of the metallic support may be at an arbitrary level so long as it is not higher than the boiling points of the solvents employed in the dope. To facilitate the drying or reduce the fluidity on the metallic support, it is preferable to set the surface temperature to a level lower by 1 to 10° C. than the boiling point of a solvent having the lowest boiling point among the solvents employed, which would not apply to the case where the dope having been cast is stripped without cooling and drying.

(Peeling)

If peeling resistance (peeling load) is large when a half-dried film is peeled from a metallic support, the film is extended irregularly in the direction of film production, causing optical anisotropic unevenness. When the peeling load is particularly large, parts where the film is extended and parts where the film is not extended are alternately arise stepwise in the direction of film production, causing the distribution of the retardation. When such a film is mounted on a liquid crystal display device, linear or band-like unevenness become observed. In order to prevent such a problem from arising, the peeling load of the film is made to be preferably 0.25 N or less per 1 cm of film peeling width. The peeling load is more preferably 0.2 N/cm or less, still more preferably 0.15 N/cm or less, and particularly preferably 0.10 N/cm or less. When the peeling load is 0.2 N/cm or less, this is particularly preferable because the unevenness resulting from the peeling is not observed at all even in the case of a liquid crystal display device in which unevenness tends to appear. As a method of reducing the peeling load, there are a method in which a releasing agent is added as mentioned above and a method in which the composition of the solvent to be used is properly selected.

The concentration of residual volatile contents at the time of peeling is preferably 5 to 60% by mass, more preferably 10 to 50% by mass, and particularly preferably 20 to 40% by mass. If the film is peeled when the volatile content is high, this is preferable because drying speed is accelerated, which improves productivity. On the other hand, when the volatile content is too high, the film has a low strength and elasticity, so that it does not stand to the peeling force, with the result that it is cut or extended. Also, the film has poor self-sustaining power after the film is peeled and deformation, wrinkles and knicks tend to be caused. Also, such a too high volatile content is a cause of the distribution of retardation.

(Stretching Treatment)

When the cyclic polyolefin-based film of the present invention is stretched, this treatment is preferably carried out in the condition that a sufficient amount of solvent still remains in the film just after the film is peeled off. The film is stretched for the purposes of (1) obtaining a film that is free from wrinkles and deformation and is excellent in plainness, and (2) increasing the in-plane retardation of the film. When the film is stretched for the purpose of the above (1), it is preferable that the stretching be carried out at a relatively high temperature and at a stretching ratio as low as 1% to 10% at most. The stretching ratio is particularly preferably 2% to 5%. When the film is stretched for the purpose of the both of the above (1) and (2) or only the above (2), it is preferable that the stretching be carried out at a relatively low temperature and at a stretching ratio of 5 to 150%.

The stretching of the film may be uniaxial stretching in only one of longitudinal and lateral directions or simultaneous or sequential biaxial stretching. As to the birefringence of a phase difference film for VA liquid crystal cells or OCB liquid crystal cells, the film preferably has a higher refractive in the direction of the width than in the direction of the length. It is therefore preferable to stretch much in the direction of the width.

The thickness of the finished (after dried) cyclic polyolefin-based film of the present invention varies depending on the purpose of use, and it is preferably from 20 to 500 μm, and more preferably from 30 to 150 μm. For liquid crystal display use, it is particularly preferably from 40 to 110 μm.

Next, the heat melt film-producing method will be explained. This method involves a step of extruding a molten cyclic olefin-based polymer from the die of an extruder in the form of a sheet and cooling the extruded polymer on a cooling roll to form a base film of the cyclic olefin-based polymer.

When the cyclic olefin-based polymer is melted in this producing method, pellets of the cyclic olefin-based polymer may be preheated in advance. The preheating temperature is preferably from (Tg−90)° C. to (Tg+15)° C., more preferably from (Tg−75)° C. to (Tg−5)° C., and still more preferably from (Tg−70)° C. to (Tg−5)° C. If the pellets are preheated at a temperature range of (Tg−90)° C. to (Tg+15)° C., the subsequent melt kneading of the resin can be uniformly carried out and therefore a desired H—V scattered light intensity and V—V scattered light intensity can be obtained.

In the above producing method, the temperature is raised to a temperature of, preferably, 200 to 300° C. to melt the cyclic olefin-based polymer with an extruder after the above preheating. At this time, it is preferable that the temperature of the outlet side of the extruder be higher than the temperature of the inlet side by, preferably, 5 to 100° C., more preferably 20 to 90° C. and still more preferably 30 to 80° C. When the temperature of the outlet side of the extruder is set to be higher than the temperature of the inlet side, the molten resin can be uniformly kneaded and therefore a desired H—V scattered light intensity and V—V scattered light intensity can be obtained.

(Moisture Permeability of the Cyclic Polyolefin-Based Film)

As to a preferable moisture permeability of the cyclic polyolefin-based film of the present invention in consideration of use as the protective film of the polarizing plate, the moisture permeability in the condition of 40° C.×90% RH is preferably from 200 to 400 (g/m$^2$/24 h), more preferably from 250 to 390 (g/m$^2$/24 h), and still more preferably from 300 to 380 (g/m$^2$/24 h). When the moisture permeability is too low, moisture is prevented from releasing from a polarizer when the polarizing plate is processed, so that the inside of the polarizer is kept under a high humidity, which accelerates the deterioration of the polarizer, bringing about a deterioration in the performance of the polarizing plate. Also, because the adhesion between a hydrophilic polarizer made of a material typified by polyvinyl alcohol and the protective film is low, the polarizer is peeled from the film, causing deterioration in the durability of the polarizing plate and reduction in yield in a punching processing. On the contrary, when the moisture permeability is too high, the adhesion between the hydrophilic polarizer and the protective film is satisfactory and there is therefore no problem caused by peeling. However, the polarizer in the inside is easily affected by fluctuations in external circumstances such as humidity and it is therefore difficult to prevent the deterioration of the polarizer in the inside, and therefore the film cannot sufficiently function as a protective film.

When the cyclic olefin-based film of the present invention is used as the protective film of a polarizing plate, it may be used on both surfaces of the polarizing plate. Alternatively, it may be used as a counter film on one of the surfaces of a polarizing plate in which a conventionally used film, such as cellulose triacetate film, is used on the other surface. The moisture permeability of the cyclic olefin-based film of the present invention is close to that of the cellulose triacetate film. Therefore, a polarizing plate using the cyclic olefin-based film on one of the surfaces of the polarizing plate and a cellulose acetate film on the other surface gives rise to no problem or few problems concerning production and processing, such as curling of the polarizing plate.

(Optical Performances of the Cyclic Polyolefin-Based Film)

Preferable optical performances of the cyclic polyolefin-based film of the present invention vary depending on the use of the film. In the case of use for the protective film of the polarizing plate, the in-plane retardation (Re) is preferably 5 nm or less and more preferably 3 nm or less. The lower limit of the in-plane retardation (Re) is preferably −400 nm. The retardation in the direction of the thickness (Rth) is preferably 50 nm or less, more preferably 35 nm or less, and particularly preferably 10 nm or less. The lower limit of the retardation in the direction of the thickness (Rth) is preferably −400 nm.

When the cyclic polyolefin-based film is used as the phase difference film, the ranges of Re and Rth vary depending on the kind of the phase difference film, to cope with a variety of needs. Re and Rth preferably satisfy the following requirements: $0 \text{ nm} \leq Re \leq 100 \text{ nm}$ and $40 \text{ nm} \leq Rth \leq 400 \text{ nm}$ at a measuring wavelength of 590 nm.

In a TN mode in which discotheque liquid crystal layers are laminated, Re and Rth preferably satisfy the following requirements: $0 \text{ nm} \leq Re \leq 20 \text{ nm}$ and $40 \text{ nm} \leq Rth \leq 80 \text{ nm}$ at a measuring wavelength of 590 nm.

In a VA mode in which bar-like liquid crystal layers are laminated, Re and Rth preferably satisfy the following requirements: $20 \text{ nm} \leq Re \leq 80 \text{ nm}$ and $80 \text{ nm} \leq Rth \leq 400 \text{ nm}$ at a measuring wavelength of 590 nm. Particularly the preferable range in a VA mode is as follows: $30 \text{ nm} \leq Re \leq 75 \text{ nm}$ and $120 \text{ nm} \leq Rth \leq 250 \text{ nm}$. In the case of compensating by one phase difference film, Re and Rth preferably satisfy the following requirements: $50 \text{ nm} \leq Re \leq 75 \text{ nm}$ and $180 \text{ nm} \leq Rth \leq 250 \text{ nm}$; and in the case of compensating by two phase difference films, Re and Rth preferably satisfy the following requirements: $30 \text{ nm} \leq Re \leq 50 \text{ nm}$ and $80 \text{ nm} \leq Rth \leq 140 \text{ nm}$, in the case of a compensation film used in a VA mode, in a more preferred embodiment from the viewpoint of the dependency on the angle of visibility of color shift and contrast when black is displayed.

In an OCB mode in which discotheque liquid crystal layers are laminated, Re and Rth preferably satisfy the following requirements: $30 \text{ nm} \leq Re \leq 70 \text{ nm}$ and $120 \text{ nm} \leq Rth \leq 300 \text{ nm}$ at a measuring wavelength of 590 nm.

The cyclic polyolefin-based film of the present invention can be provided with desired optical performances in actual by properly controlling process conditions such as the structure of the polymer to be used, the kinds and amounts of additives, stretching ratio and the content of residual volatile components when peeling the film.

In this specification, $Re(\lambda)$ and $Rth(\lambda)$ represent an in-plane retardation and a retardation in the thickness direction, respectively, at a wavelength of $\lambda$ nm. $Re(\lambda)$ can be measured by means of KOBRA 21 ADH (manufactured by Oji Keisoku Kiki K.K.) by introducing an incident light of a wavelength of $\lambda$ nm in the normal direction of the film. $Rth(\lambda)$ is calculated by means of KOBRA 21ADH based on the above-mentioned $Re(\lambda)$; retardation values measured in plural directions such as a retardation value measured by introducing an incident light of a wavelength of $\lambda$ nm in the direction +40° inclined with respect to the normal of the film with the in-plane slow axis (determined by KOBRA 21ADH) being the inclined axis (rotation axis) and a retardation value measured by introducing an incident light of a wavelength of $\lambda$ nm in the direction −40° inclined with respect to the normal of the film with the in-plane slow axis being the inclined axis (rotation axis); a hypothetical value of the average refractive index; and a input film thickness. Here, as a hypothetical value of the average refractive index, those values can be used which are described in Polymer Handbook (JOHN WILEY & SONS, INC) and various catalogues of optical films. With materials whose average refractive indexes are not known, the average refractive index can be measured by means of an Abbe's refractometer. Values of the average refractive indexes of main optical films are illustrated below. Cellulose acylate (1.48), cycloolefin polymer (1.52), polycarbonate (1.59), polymethyl methacrylate (1.49) and polystyrene (1.59). Herein, the measuring wavelength $\lambda$ used is 590 nm.

(Polarizing Plate)

In usual, the polarizing plate comprises a polarizer and transparent protective films provided on both side of the polarizer. In the present invention, the cyclic polyolefin-based film of the present invention is used as both or one of the protective films. As the other protective film, use may be made of a commonly employed cellulose acetate film. Examples of the polarizer include an iodine-series polarizer, a dye-series polarizer using a dichromatic dye and a polyene-series polarizer. The iodine-series polarizer and the dye-series polarizer are generally prepared from polyvinyl alcohol-series films. In the case of using the cyclic polyolefin-based film of the present invention as the protective film(s) for the polarizing plate, it is preferable that the film is surface-treated as described later and then the treated surface and the polarizer are bonded to each other by using an adhesive. As an adhesive to be used, use may be made of, for example, polyvinyl alcohol-based adhesives such as polyvinyl alcohol and polyvinyl butyral, vinyl-based latexes such as butyl acrylate, and gelatin. The polarizing plate is composed of the polarizer and the protective films protecting both faces thereof. It may further have a protect film on a face of the polarizing plate and a separate film on the other face. The protect film and the separate film are employed in order to protect the polarizing plate during shipment, product inspection and other steps. In this case, the protect film, which aims at protecting the surface of the polarizing plate, is bonded to the face opposite to the face to be bonded to a liquid crystal plate. On the other hand, the separate film, which aims at covering the adhesive layer to be boned to the liquid crystal plate, is bonded to the face of the polarizing plate to be bonded to the liquid crystal face.

As to the method of bonding the cyclic polyolefin-based film of the present invention to the polarizer, it is preferable to carry out the bonding such that the transmission axis of the polarizer accords to the slow axis of the cyclic polyolefin-based film of the present invention.

(Surface Treatment of the Cyclic Polyolefin-Based Film)

In the present invention, for the purpose of improving adhesiveness between the polarizer and the protective film(s), the surface of the cyclic polyolefin-based protective film(s) is preferably subjected to a surface treatment. With respect to the surface treatment, any method may be utilized so far as it is able to improve the adhesiveness. Preferred examples of the surface treatment include a glow discharge treatment, an ultraviolet irradiation treatment, a corona treatment, and a flame treatment. The glow discharge treatment as referred to herein is a so-called low-temperature plasma occurred under a low-pressure gas. In the present invention, a plasma treatment under the atmospheric pressure is also preferable. Besides, the details of the glow discharge treatment are described in U.S. Pat. No. 3,462,335, U.S. Pat. No. 3,761,299, U.S. Pat. No. 4,072,769, and U.K. Patent No. 891,469. A method described in JP-T-59-556430 ("JP-T" means searched and published International patent application) in which the gas composition of the discharge atmosphere is limited to only a gas species generated within a vessel when after starting the discharge, a polyester support itself is subjected to a discharge treatment is also employed. Also, a method described in JP-B-60-16614 ("JP-B" means examined Japanese patent publication) in which in performing a vacuum glow discharge treatment, the discharge treatment is performed at a surface temperature of the film of 80° C. or higher and 180° C. or lower can be employed.

The degree of the surface treatment varies with respect to its preferred range depending upon the kind of the surface treatment and the kind of the cyclic polyolefin. It is preferable that as a result of the surface treatment, a contact angle of the surface of the protective film having been subjected to a surface treatment against pure water becomes less than 50° C. The foregoing contact angle is more preferably 25° or more and less than 45°. When the contact angle of the surface of the protective film against pure water falls within the foregoing ranges, an adhesive strength between the protective film and the polarizing film (polarizer) becomes satisfactory (Adhesive)

In the present invention, in laminating the polarizer made of polyvinyl alcohol and the protective film made of the cyclic polyolefin-based film, which has been subjected to a surface treatment, an adhesive containing a water-soluble polymer is preferably used.

Examples of the water-soluble polymer which is preferably used in the foregoing adhesive include homopolymers or copolymers containing, as a constitutional element, an ethylenically unsaturated monomer such as N-vinylpyrrolidone, acrylic acid, methacrylic acid, maleic acid, β-hydroxyethyl acrylate, β-hydroxyethyl methacrylate, vinyl alcohol, methyl vinyl ether, vinyl acetate, acrylamide, methacrylaride, diacetone acrylamide, and vinylimidazole; and polyoxyethylene, polyoxypropylene, poly-2-methyloxazoline, methyl cellulose, hydroxyethyl cellulose, hydroxypropyl cellulose, and gelatin. Of these, PVA (polyvinyl alcohol) and gelatin are preferable in the present invention. The thickness of the adhesive layer after drying is preferably 0.01 to 5 μm, and particularly preferably 0.05 to 3 μm.

(Anti-Reflection Layer)

In the polarizing plate, a functional film such as an anti-reflection layer is preferably provided on the transparent protective film on opposite side to a liquid crystal cell. Particularly, in the present invention, an antireflection layer which is a laminate of at least one light-scattering layer and at least one low-refractive index layer provided in this order on the transparent protective film or a laminate of a middle-refractive-index layer, a high-refractive-index layer and a low-refractive-index layer provided in this order on the transparent protective film is preferably used.

(Light-Scattering Layer)

The light-scattering layer is formed for imparting, to the film, light-scattering characteristics resulting from surface scattering and/or internal scattering and hardcoat characteristics to improve scratch resistance of the film. Therefore, the light-scattering layer is generally formed to contain a binder, which imparts hardcoat characteristics; matt particles, which impart light-scattering characteristics; and, if necessary, inorganic fillers, which raise refractive index, prevent crosslinking shrinkage from occur, and enhance mechanical strength.

The film thickness of the light-scattering layer is preferably 1 to 10 μm and more preferably 1.2 to 6 μm, to impart the hardcoat characteristics and to inhibit the generation of curling and a deterioration in fragility.

(Other Layers in Antireflective Layer)

It is also possible to form, for example, a hard coat layer, a forward scattering layer, a primer layer, an antistatic layer, an undercoat layer and a protective layer.

(Hard Coat Layer)

In order to impart the physical strength of the transparent protective film having the anti-reflection layer, a hard coat layer is generally formed on the transparent support. It is particularly preferable to provide the hard coat layer between the transparent support and the high-refractive-index layer as described above. The hard coat layer is formed preferably by a crosslinking reaction of a photo and/or heat hardening compound or a polymerization reaction. As a hardening functional group in the hardening compound, a photo polymerizable functional group is preferred. It is also preferable to use an organic alkoxysilyl compound or an organic metal compound having a hydrolysable functional group.

(Antistatic Layer)

In the case of forming an antistatic layer, it is preferable to impart an electrical conductivity represented by a volume resistivity of $10^{-8}$ ($\Omega cm^{-3}$) or less. Although a volume resistivity of $10^{-8}$ ($\Omega cm^{-3}$) can be established by using, for example, a hygroscopic substance, a water-soluble inorganic salt, a certain surfactant, a cationic polymer, an anionic polymer or colloidal silica, the volume resistivity highly depends on temperature and humidity and, therefore, there arises a problem that a sufficient conductivity cannot be ensured under a low humidity. Therefore, it is preferable to employ a metal oxide as a material for the conductive layer.

(Liquid Crystal Display Device)

The cyclic polyolefin-based film of the present invention, the phase difference film comprising the above film, and the polarizing plate comprising the film may be used for liquid crystal display devices and liquid crystal cells of various display modes. There have been proposed various display modes such as TN (twisted nematic) mode, IPS (in-plane switching) mode, FLC (ferroelectric liquid crystal) mode, AFLC (anti-ferroelectric liquid crystal) mode, OCB (optically compensatory bend) mode, STN (super twisted nematic) mode, VA (vertically aligned) mode and HAN (hybrid aligned nematic) mode. The cyclic polyolefin-based film of the present invention is preferably usable in the VA mode or the OCB mode among them.

The cyclic olefin-based polymer of the present invention is excellent in all of the following characteristics: optical performances, heat resistance, bonding properties, adhesive properties and anti-hygroscopic properties. Further, according to the present invention, it is possible to produce such a cyclic olefin-based polymer. Furthermore, the optical material of the present invention is excellent in adhesive properties and applicability to a polarizer, has a preferable moisture permeability making it possible to suppress the deterioration of a polarizing plate, and is reduced in optical performance fluctuation as a result of fluctuations in environmental temperature and moisture. Also, the polarizing plate and liquid crystal display device of the present invention can exhibit excellent optical performances.

The present invention will be described in more detail based on the following examples, but the invention is not intended to be limited thereto.

EXAMPLES

Each method for measuring the performances in EXAMPLES is as follows.

(Moisture Permeability)

A 70-mmφ sample was moisture-controlled at 40° C. under a humidity of 90% RH for 24 hours, to calculate the amount of water content per unit area ($g/m^2$), by using a moisture permeability tester (trade name: KK-709007, manufactured by Toyoseiki Seisaku-sho, Ltd.) according to JIS Z-0208, and the moisture permeability was found according to the following equation.

(Moisture permeability)=(Mass after moisture-conditioning)−(Mass before moisture-conditioning)

(Water Absorbance)

The water absorbance of a sample was measured after the sample was dipped in water at 25° C. for 24 hours.

(Bonding and Adhesive Properties)

Aluminum was deposited on a test piece of 10 cm×10 cm. The deposited film was cut with a cutter to form notches and to give 10×10 squares of 1×1 mm. And, the squares were subjected to a peeling test using a scotch tape, to measure the number of peeled blocks among 25 blocks.

(Humidity Dependencies of Retardation in the Direction of the Thickness (Rth) and Dimensional Fluctuation)

The measuring wavelength λ to be used was 590 nm. The humidity dependency was measured under humidity-controlled conditions of 25° C. and 10% RH and 25° C. and 80% RH for 2 hours. The fluctuation rate of Rth was calculated using the following equation.

(Fluctuation rate of $Rth(\%)$)=[$Rth(10\% RH)$−$Rth(80\% RH)$]/$Rth(10\%RH)$×100.

(Tensile Elastic Modulus)

A film sample (1.0 cm×5.0 cm piece) was made to measure the tensile elastic modulus under the condition of a tension speed of 3 mm/min. by using a Tensilon RTM-25 (trade name, manufactured by Toyo Boldwin (k.k.)). The measurement was made to obtain each tensile elastic modulus of 3 samples, to calculate an average of the elastic modulus of 3 samples, thereby evaluating the film (The sample was used after standing at 25° C. under a humidity of RH 60% overnight. Distance between chucks was 3 cm.).

Example 1

Synthesis of a Cyclic Polyolefin-Based Polymer P-1 and Production of a Film

Into a reaction kettle, 200 parts by mass of refined toluene, 8 parts by mass of 5-norbornene-2-methanol (manufactured by Aldrich Corporation), 76 parts by mass of 2-acetoxymethyl-5-norbornene (obtained by acetylating the above 5-norbornene-2-methanol with acetic anhydride) and 12.4 parts by mass of norbornene (manufactured by Aldrich Corporation) were poured. Then, a solution obtained by dissolving 0.1 parts by mass of palladium (II) acetylacetonate (manufactured by Tokyo Chemical Industry Co., Ltd.), 0.092 parts by mass of tricyclohexylphosphine (manufactured by STREM) and 0.52 parts by mass of dimethylaluminumtetrakis(pentafluorophenyl) borate (manufactured by STREM) in 20 parts by mass of methylene chloride was poured into the reaction kettle. The mixture in the reaction kettle was reacted at 90° C. with stirring for 18 hours. After the reaction was finished, the reaction mixture was poured into excess methanol to produce polymer precipitates. Polymer (P-1) obtained by purifying the precipitates was dried at 110° C. by vacuum drying for 8 hours.

The obtained polymer was dissolved in tetrahydrofuran to measure the molecular weight by gel permeation chromatography. It was found that the number average molecular weight was 69,000 and the weight average molecular weight was 172,000 based on polystyrene. The ratio of the repeating unit derived from 5-norbornene-2-methanol was measured using an infrared absorption spectrum, and it was 8.0 mol %. The polymer was dissolved in a mixed solvent of methylene chloride/methanol (90/10 in mass ratio) and the resulting solution was cast using a band casting machine. The film peeled from the band when the amount of residual solvents was about 25% by mass was stretched in the direction of the width at a stretching ratio of 2% by using a tenter. Then, the film was dried by blowing hot air while supporting the film so as to form no wrinkle on the film. Then, the conveyer of the film was changed from the tenter to a roll on which the film was further dried at 120° C. to 140° C. and wound. The obtained film (F-1) was evaluated as to thickness, moisture permeability, water absorbance, humidity-depending dimensional fluctuation, humidity-depending retardation fluctuation, bonding and adhesive properties, and tensile elastic modulus. The results of the evaluations are shown in Table 1.

Example 2

Synthesis of a Cyclic Polyolefin-Based Polymer P-2 and Production of a Film

A polymer (P-2) was produced in the same manner as in Example 1, except that the monomers were replaced with 3.6 parts by mass of 5-norbornene-2-ol, 40 parts by mass of 5-ethyl-2-norbornene and 45 parts by mass of methyl 5-norbornene-2-carboxylate (manufactured by Tokyo Chemical Industry Co., Ltd.).

The obtained polymer was dissolved in tetrahydrofuran to measure the molecular weight by gel permeation chromatography. It was found that the number average molecular weight was 75,000 and the weight average molecular weight was 168,000 based on polystyrene. The ratio of the repeating unit derived from 5-norbornene-2-ol was measured using an infrared absorption spectrum, and it was 4.8 mol %. This polymer was processed in the same manner as in Example 1 to produce a stretched film (F-2) to evaluate its thickness, moisture permeability, optical performances, water absorbance, bonding and adhesive properties, and tensile elastic modulus. The results of the evaluations are shown in Table 1.

Example 3

Synthesis of a Cyclic Polyolefin-Based Polymer P-3 and Production of a Film

A polymer (P-3) was produced in the same manner as in Example 1, except that the monomers were replaced with 4.5 parts by mass of 2-(1-hydroxyethyl)-5-norbornene, 31 parts by mass of 2-norbornene and 45 parts by mass of methyl 5-norbornene-2-carboxylate (manufactured by Tokyo Chemical Industry Co., Ltd.).

The obtained polymer was dissolved in tetrahydrofuran to measure the molecular weight by gel permeation chromatography. It was found that the number average molecular weight was 69,000 and the weight average molecular weight was 185,000 based on polystyrene. The ratio of the repeating unit derived from 2-(1-hydroxyethyl)-5-norbornene was measured using an infrared absorption spectrum, and it was 4.5 mol %. This polymer was processed in the same manner as in Example 1 to produce a stretched film (F-3) to evaluate its thickness, moisture permeability, optical performances, water absorbance, bonding and adhesive properties, and tensile elastic modulus. The results of the evaluations are shown in Table 1.

Example 4

Synthesis of a Cyclic Polyolefin-Based Polymer P-4 and Formation of a Film

A copolymer was produced in the same manner as in Example 1, except that the monomers were replaced with 60 parts by mass of 5-norbornene-2-yl acetate (manufactured by Aldrich Corporation) and 25 parts by mass of 2-norbornene (manufactured by Aldrich Corporation).

50 parts by mass of the copolymer was dissolved in 500 parts by mass of tetrahydrofuran, to which 15 g of an aqueous 25% potassium hydroxide solution was then added and the mixture was refluxed under heating for one hour. After the reaction was finished, the reaction mixture was neutralized by adding dilute hydrochloric acid. The reaction mixture was poured into excess methanol to produce polymer precipitates. Polymer (P-4) obtained by purifying the precipitates was dried at 110° C. by vacuum drying for 8 hours.

The obtained polymer was dissolved in tetrahydrofuran to measure the molecular weight by gel permeation chromatography. It was found that the number average molecular weight was 87,000 and the weight average molecular weight was 183,000 based on polystyrene. The ratio of the repeating unit derived from 5-hydroxy-2-norbornene was measured using an infrared absorption spectrum, and it was 9.1 mol %. This polymer was processed in the same manner as in Example 1 to produce a stretched film (F-4) to evaluate its thickness, moisture permeability, optical performances, water absorbance, bonding and adhesive properties, and tensile elastic modulus. The results of the evaluations are shown in Table 1.

Example 5

Synthesis of a Cyclic Polyolefin-Based Polymer P-5 and Formation of a Film

A copolymer P-5 was produced in the same manner as in Example 1, except that the monomers were replaced with 10 parts by mass of 2-hydroxy-1,4,5,8-dimethano-1,2,3,4,4a,5,8,8a-octahydronaphthalene, 54 parts by mass of 5-norbornene-2-yl acetate (manufactured by Aldrich Corporation) and 23 parts by mass of norbornene (manufactured by Aldrich Corporation).

The obtained polymer was dissolved in tetrahydrofuran to measure the molecular weight by gel permeation chromatography. It was found that the number average molecular weight was 65,000 and the weight average molecular weight was 163,000 based on polystyrene. The ratio of the repeating unit derived from 2-hydroxy-1,4,5,8-dimethano-1,2,3,4,4a,5,8,8a-octahydronaphthalene was measured using an infrared absorption spectrum, and it was 7.1 mol %. This polymer was processed in the same manner as in Example 1 to produce a stretched film (F-5) to evaluate its thickness, moisture permeability, optical performances, water absorbance, bonding and adhesive properties, and tensile elastic modulus. The results of the evaluations are shown in Table 1.

Comparative Examples 1 and 2

Synthesis of Cyclic Polyolefin Polymers PH-1 and PH-2 and Formation of Films

The following comparative polymers (PH-1 and PH-2) were synthesized and stretched films (FH-1 and FH-2) were obtained from these polymers in the same manner as in Example 1. The results of various evaluations are shown in Table 1.

PH-1: Methyl 5-norbornene-2-carboxylate polymer

PH-2: 5-butyl-2-norbornene polymer

Comparative Example 3

The results of various evaluations of a commercially available triacetylcellulose film (trade name: Fujitack TD80UF) (FH-3) are shown in Table 1.

TABLE 1

| | Evaluation of each film | | | | | | | |
|---|---|---|---|---|---|---|---|---|
| Film No. | F-1 | F-2 | F-3 | F-4 | F-5 | FH-1 | FH-2 | FH-3 |
| Thickness (μm) | 80 | 80 | 81 | 80 | 80 | 81 | 80 | 80 |
| Moisture permeability (g/m$^2$) | 420 | 400 | 350 | 410 | 390 | 790 | 20 | 420 |

TABLE 1-continued

| Evaluation of each film | | | | | | | | |
|---|---|---|---|---|---|---|---|---|
| Film No. | F-1 | F-2 | F-3 | F-4 | F-5 | FH-1 | FH-2 | FH-3 |
| Water absorbance (%) | 1.5 | 1.3 | 0.8 | 1.2 | 1 | 2.8 | 0 | 2.9 |
| Humidity-depending dimensional fluctuation (%) | 0.18 | 0.15 | 0.1 | 0.12 | 0.13 | 0.26 | 0 | 0.41 |
| Humidity-depending Rth fluctuation (%) | 4 | 5 | 3 | 3 | 4 | 3 | 1 | 50 |
| Bonding and adhesive properties | 0 | 0 | 0 | 0 | 0 | 0 | 9 | 0 |
| Tensile elastic modulus (MPa) | 1820 | 1780 | 1800 | 1750 | 1720 | 1730 | 1100 | 3990 |

As is clear from the results shown in Table 1, the cyclic olefin-based films of the present invention had sufficient moisture permeability and were excellent in the processability of a polarizing plate. In addition, they were reduced in the moisture dependencies of the retardation (Rth) fluctuation and dimensional fluctuation. Therefore, they were remarkably excellent than the conventional film, in particularly, the triacetylcellulose film.

Also, as is clear from Table 1, the cyclic olefin-based films of the present invention were superior in bonding and adhesive properties. On the other hand, the conventional cyclic olefin-based film (FH-2) being highly hydrophobic had low bonding and adhesive properties.

Further, as is clear from the results shown in Table 1, the cyclic olefin-based film of the present invention had proper moisture permeability, water absorbance, and moisture dependencies of dimensional fluctuation and Rth fluctuation. On the other hand, although the conventional cyclic olefin-based film (FH-1) was superior to the triacetylcellulose film in the points of the water absorbance, and the moisture dependencies of dimensional fluctuation and Rth fluctuation, it had large moisture permeability. Therefore, there was a problem concerning the durability of a polarizing plate when it was used for the polarizing plate or liquid crystal display device, as described later.

Example 6

Production of Polarizing Plates and Evaluation of Liquid Crystal Display Devices Using the Polarizing Plates A stretched polyvinyl alcohol film was made to absorb iodine, to prepare a polarizer.

The cyclic polyolefin film (F-1) produced in Example 1 was subjected to a glow discharge treatment (high frequency voltage (3,000 Hz, 4,200 V) was applied between the upper and lower electrodes for 20 seconds). Thereafter, the film was bonded to the front and back sides of the polarizer by using a polyvinyl alcohol-based adhesive, followed by drying at 70° C. for 10 minutes or more, to obtain a polarizing plate (Pol-1).

Next, polarizing plates (Pol-2 to Pol-5) according to the present invention and a comparative polarizing plate (PolH-1) were manufactured using the cyclic polyolefin films (F-2 to F-5) of the present invention and the comparative films (FH-1 and FR-2), respectively, in the same manner as in the case of the polarizing plate (Pol-1). Here, in the case of the comparative film (FH-2), the rate of drying to remove water left in the polyvinyl alcohol polarizer was very low and a polarizing plate having high quality could not be obtained.

In the case of the comparative film (FH-3), the comparative polarizing plate (PolH-3) was prepared using a known method.

<Durability of Polarizing Plates>

The thus-obtained polarizing plates were heated in the wet heat condition of 60° C. and 95% RH for 1,000 hours, and then the transmittance and the degree of polarization of the polarizing plates before and after heating were measured to observe a fluctuation in the states of the polarizing plates. As a result, it was found that the polarizing plates (Pol-1 to Pol-5) of the present invention were excellent in durability. On the other hand, the comparative polarizing plate was increased in fluctuation, giving rise to durability problem.

Among a pair of polarizing plates disposed so as to sandwich a liquid crystal layer in each of a 26-inch and a 40-inch liquid crystal display devices (manufactured by Sharp Corporation) using a VA-mode liquid crystal cell, the polarizing plate on the observer side was peeled off, and instead, the above polarizing plate was applied by using an adhesive, wherein the transmission axis of the observer side polarizing plate and the transmission axis of the polarizing plate of the backlight side were made to cross each other at right angles, to produce a liquid crystal display device. The resulting liquid crystal display device was observed to examine light leakage and color unevenness generated in black display state and in-plane uniformity. In the case of the films (F-1 to F-5) of the present invention, there was no hue fluctuation and therefore they were very excellent.

Also, the films (F-1 to F-5) of the present invention were used to produce low-reflective films according to the method in Examples 47 of Japan Institute of Invention and Innovation, Open Technical Report (Open technical No. 2001-1745). As a result, the low-reflective films exhibited good optical performances.

The films of the present invention were coated with a liquid crystal layer according to the method in Example 1 of JP-A-11-316378. As a result, excellent optical compensation films were obtained.

INDUSTRIAL APPLICABILITY

The cyclic olefin-based film of the present invention can be suitably used for various functional films, such as a phase difference film and film enlarging the angle of visibility used in liquid crystal display devices and the like, and anti-reflection films used in plasma displays. In addition, the cyclic olefin-based film of the present invention can be suitable used as a protective film of a polarizing plate, and used for a polarizing plate and an image display device.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A cyclic olefin-based polymer comprising a repeating unit represented by formula (1):

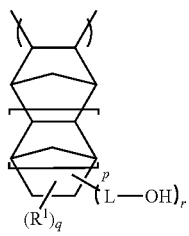

Formula (1)

wherein $R^1$ represents a substituent; L represents a single bond or a divalent linking group, and forms an alcohol together with the —OH group; p represents an integer of 0 or 1; q represents an integer of from 0 to 3; r represents an integer of from 1 to 4; and $R^1$ and L may be combined with each other to form a 5- to 7-membered ring, and wherein the weight average molecular weight of the cyclic olefin-based polymer is 70,000 to 700,000 based on polystyrene.

2. The cyclic olefin-based polymer according to claim 1, wherein said cyclic olefin-based polymer further comprises a repeating unit represented by formula (2):

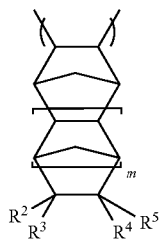

Formula (2)

wherein $R^2$, $R^3$, $R^4$ and $R^5$ each independently represent a hydrogen atom or a substituent excluding an alkyl group having 3 or more carbon atoms; m represents an integer of 0 or 1; and $R^2$, $R^3$, $R^4$ and $R^5$ may be combined with each other to form 5- to 7-membered ring.

3. The cyclic olefin-based polymer according to claim 1, wherein the content of the repeating unit represented by formula (1) is 1 mol % to 20 mol % based on all repeating units.

4. The cyclic olefin-based polymer according to claim 2, wherein the content of the repeating unit represented by formula (2) is 80 mol % to 99 mol % based on all repeating units.

5. The cyclic olefin-based polymer according to claim 1, wherein, in formula (1), R' is a halogen atom, an alkyl group having 1 to 10 carbon atoms, an aryl group having 6 to 10 carbon atoms, a cycloalkyl group having 3 to 10 carbon atoms, a cyano group, an acyloxy group having 2 to 10 carbon atoms or an alkoxycarbonyl group having 2 to 10 carbon atoms.

6. The cyclic olefin-based polymer according claim 1, wherein, in formula (1), L is a single bond or an alkylene group having 1 to 6 carbon atoms.

7. The cyclic olefin-based polymer according to claim 1, wherein, in formula (1), p is an integer of 0.

8. The cyclic olefin-based polymer according to claim 1, wherein, in formula (1), q is an integer of 0 or 1.

9. The cyclic olefin-based polymer according to claim 1, wherein, in formula (1), r is an integer of 1 or 2.

10. The cyclic olefin-based polymer according to claim 1, wherein said polymer has the glass transition temperature of 200 to 350° C.

11. The cyclic olefin-based polymer according to claim 1, wherein said polymer has the tensile elastic modulus of 1,500 MPa or more.

12. A method of producing the cyclic olefin-based polymer according to claim 1, which comprises hydrolyzing or solvolyzing a cyclic olefin-based polymer containing a repeating unit represented by formula (3):

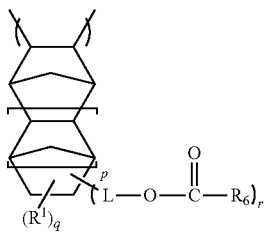

Formula (3)

wherein $R^1$ represents a substituent; L represents a single bond or a divalent linking group; p represents an integer of 0 or 1; q represents an integer of from 0 to 3; r represents an integer of from 1 to 4; R' and L may be combined with each other to form a 5- to 7-membered ring; and $R^6$ represents a substituent.

13. The producing method according to claim 12, wherein the cyclic olefin-based polymer containing a repeating unit represented by formula (3) further comprises a repeating unit represented by formula (2):

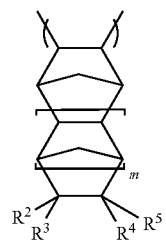

Formula (2)

wherein $R^2$, $R^3$, $R^4$ and $R^5$ each independently represent a hydrogen atom or a substituent excluding an alkyl group having 3 or more carbon atoms; m represents an integer of 0 or 1; and $R^2$, $R^3$, $R^4$ and $R^5$ may be combined with each other to form 5- to 7-membered ring.

14. An optical material comprising the cyclic olefin-based polymer according to claim 1.

15. The optical material according to claim 14, wherein the optical material is in a state of thin film form, film form or sheet form.

16. A polarizing plate comprising a polarizer and two protective films disposed on each side of the polarizer, wherein at least one of the protective films is the optical material according to claim 15.

17. A liquid crystal display device comprising at least the polarizing plate according to claim 16.

18. The liquid crystal display device according to claim 17, wherein the device is used in a TN mode, wherein the device is produced by laminating discotheque liquid crystal layers, and wherein at least one of the protective films constituting the polarizing plate used in the liquid crystal display device satisfies the following requirements: 0 nm≦(in-plane retardation Re(590))≦20 nm and 40 nm≦(retardation in the film thickness direction Rth(590))≦80 nm.

19. The liquid crystal display device according to claim 17, wherein the device is used in a VA mode, wherein the device is produced by laminating bar-like liquid crystal layers, and wherein at least one of the protective films constituting the polarizing plate used in the liquid crystal display device satisfies the following requirements: 30 nm≦(in-plane retardation Re(590))≦75 nm and 120 nm≦(retardation in the film thickness direction Rth(590))≦250 nm.

20. The liquid crystal display device according to claim 17, wherein the device is used in an OCB mode, wherein the device is produced by laminating discotheque liquid crystal layers, and wherein at least one of the protective films constituting the polarizing plate used in the liquid crystal display device satisfies the following requirements: 30 nm≦(in-plane retardation Re(590))≦70 nm and 120 nm≦(retardation in the film thickness direction Rth(590))≦300 nm.

21. The cyclic olefin-based polymer according to claim 2, wherein in Formula (2), $R^2$, $R^3$, $R^4$ and $R^5$ each independently represent a hydrogen atom, a halogen atom, an alkyl group having 1 to 2 carbon atoms, an aryl group having 6 to 10 carbon atoms, an alkoxy group having 1 to 10 carbon atoms, a cyano group, an acyloxy group having 2 to 10 carbon atoms, an alkoxycarbonyl group having 2 to 10 carbon atoms, an acyl group having 1 to 10 carbon atoms or a carboxyl group; $R^2$, $R^3$, $R^4$ and $R^5$ may be combined with each other to form a 5- or 7-membered ring.

22. The producing method according to claim 13, wherein in Formula (2), $R^2$, $R^3$, $R^4$ and $R^5$ each independently represent a hydrogen atom, a halogen atom, an alkyl group having 1 to 2 carbon atoms, an aryl group having 6 to 10 carbon atoms, an alkoxy group having 1 to 10 carbon atoms, a cyano group, an acyloxy group having 2 to 10 carbon atoms, an alkoxycarbonyl group having 2 to 10 carbon atoms, an acyl group having 1 to 10 carbon atoms or a carboxyl group; $R^2$, $R^3$, $R^4$ and $R^5$ may be combined with each other to form a 5- or 7-membered ring.

* * * * *